US005746984A

United States Patent [19]
Hoard

[11] Patent Number: 5,746,984
[45] Date of Patent: May 5, 1998

[54] EXHAUST SYSTEM WITH EMISSIONS STORAGE DEVICE AND PLASMA REACTOR

[75] Inventor: John W. Hoard, Livonia, Mich.

[73] Assignee: Low Emissions Technologies Research and Development Partnership, Dearborn, Mich.

[21] Appl. No.: 673,351

[22] Filed: Jun. 28, 1996

[51] Int. Cl.$^6$ .............................. B01D 50/00; B01J 19/08
[52] U.S. Cl. ............... 422/169; 422/186.03; 422/186.04; 204/164
[58] Field of Search .................. 422/186.03, 186.04, 422/168, 169; 588/212; 204/164

[56] References Cited

U.S. PATENT DOCUMENTS

| | | | |
|---|---|---|---|
| 5,401,372 | 3/1995 | Liu et al. | 204/295 |
| 5,456,807 | 10/1995 | Wachsman | 204/59 R |
| 5,458,748 | 10/1995 | Breault et al. | 204/177 |
| 5,490,973 | 2/1996 | Grothaus et al. | 422/186.04 |
| 5,492,678 | 2/1996 | Ota et al. | 422/174 |
| 5,505,909 | 4/1996 | Dummersdorf et al. | 422/168 |
| 5,534,659 | 7/1996 | Springer et al. | 588/277 |
| 5,603,893 | 2/1997 | Gunderson et al. | 422/22 |
| 5,609,736 | 3/1997 | Yamamoto | 204/164 |

FOREIGN PATENT DOCUMENTS

| | | |
|---|---|---|
| 0 366 876 | 5/1990 | European Pat. Off. . |
| 5-115746 | 5/1993 | Japan . |
| 06015143A | 1/1994 | Japan . |
| 06106025A | 4/1994 | Japan . |
| 06178914A | 6/1994 | Japan . |
| 94-163210 | 6/1994 | Japan . |
| 94-251821 | 6/1994 | Japan . |
| 06269635A | 9/1994 | Japan . |
| 7-116460 | 5/1995 | Japan . |
| 95-316084 | 7/1995 | Japan . |

OTHER PUBLICATIONS

Takaaki Morimune, Yuji Ejiri, and Kotaroh Kuroki, Removal of $NO_x$ Contained in Combustion Exhaust Gas by $N_2$ Plasma Injection, JSAE Conference Proceedings 911 1991–5 (179–182) (English translation).

G.E. Vogtlin and B.M. Penetrante, Pulsed Corona Discharge for Removal of $NO_x$ from Flue Gas, Non–Thermal Plasma Techniques for Pollution Control, Part B–Electron Beam and Electrical Discharge Processing 187 (1993).

A. Colletta, G. Costa, and M. Pinti, Self–Cleaning Electrostatic Muffler for Diesel Vehicles, Emission Processes and Control Technologies in Diesel Engines (SAE Technical Paper Series 952389) 189 (1995).

E. Robert Fanick and Bruce B. Bykowski, Simultaneous Reduction of Diesel Particulate and $NO_x$ Using A Plasma, Progress in Emission Control Technologies (SAE Technical Paper Series 942070) 239 (1994).

John H. Johnson, Susan T. Bagley, Linda D. Gratz, and David G. Leddy, A Review of Diesel Particulate Control Technology and Emissions Effects—1992 Horning Memorial Award Lecture, Diesel Exhaust Aftertreatement 1994 (SAE Technical Paper Series 940233) 1 (1994).

Nagatoshi Suzuki, Manabu Higashi, Satoshi Uchida, and Kan–ichi Fujii, Simultaneous Removal of $NO_x$ $SO_x$ and Soot in Diesel Engine Exhaust by Plasma/Oil Dynamics Means (SAE Technical Paper Series 910562) 147.

*Primary Examiner*—Nina Bhat
*Attorney, Agent, or Firm*—Harness, Dickey & Pierce, P.L.C.

[57] ABSTRACT

An exhaust system for a combustion system, comprising a storage device for collecting $NO_x$ hydrocarbon, or particulate emissions, or mixture of these emissions, and a plasma reactor for destroying the collected emissions is described. After the emission is collected in by the storage device for a period of time, the emission is then destroyed in a non-thermal plasma generated by the plasma reactor. With respect to the direction of flow of the exhaust stream, the storage device must be located before the terminus of the plasma reactor, and it may be located wholly before, overlap with, or be contained within the plasma reactor.

10 Claims, 3 Drawing Sheets

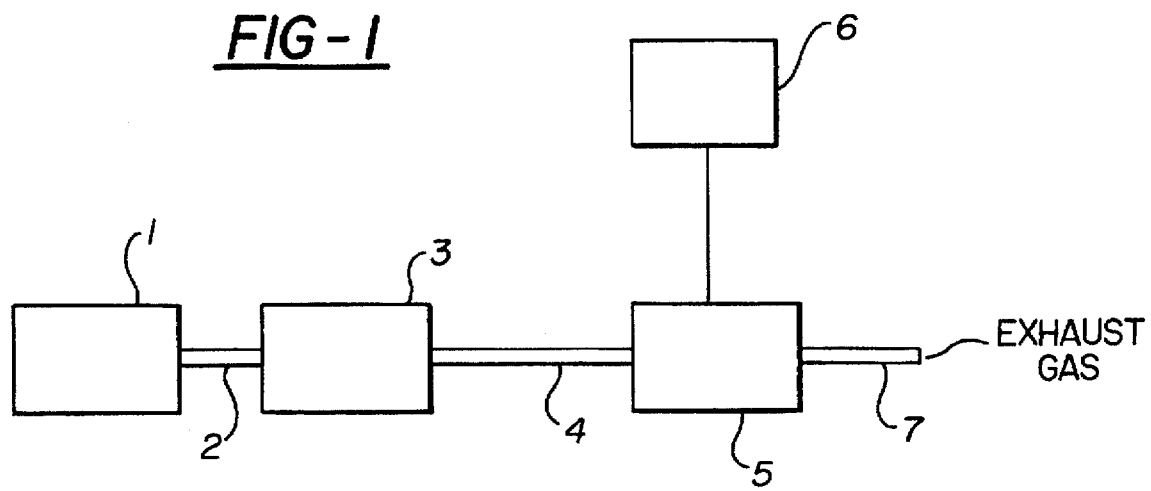
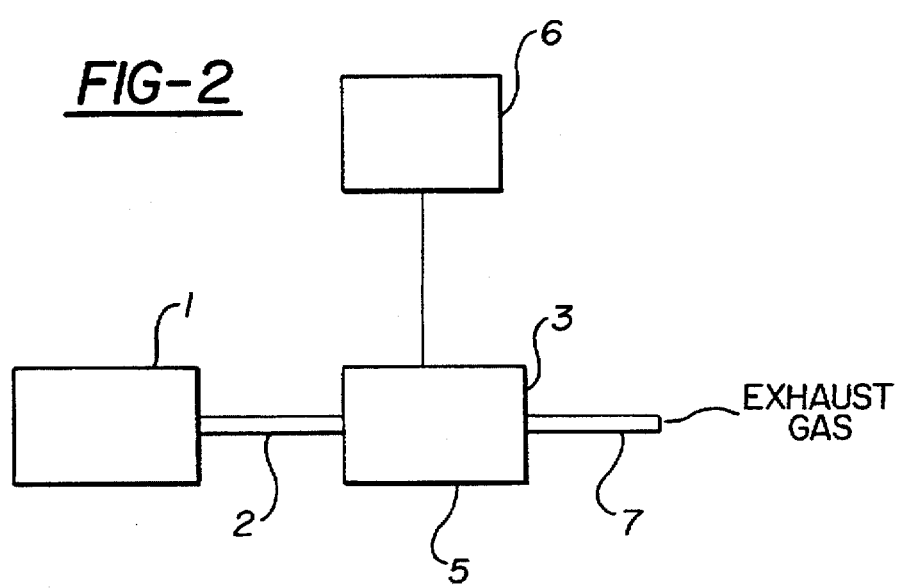

though present in the exhaust stream in relatively dilute concentrations, are concentrated in the storage device. After a period of collection, the emissions are released from the storage device into a non-thermal plasma reactor, where the released emissions are destroyed using a non-thermal plasma.

EXHAUST SYSTEM WITH EMISSIONS STORAGE DEVICE AND PLASMA REACTOR

GOVERNMENT RIGHTS

The U.S. Government may have rights in this invention.

FIELD OF THE INVENTION

This invention relates to an exhaust system for the exhaust or effluent stream from a combustion process, such as from an internal combustion engine, and particularly to an automotive exhaust system. The exhaust system of the invention comprises both a storage device for collecting one or more of nitrogen oxides, particulates, or hydrocarbon emissions from the exhaust stream and a plasma reactor that can generate a non-thermal plasma to destroy the collected emissions.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are hydrocarbons, soot particulates, and nitrogen oxide compounds ($NO_x$). There are a wide variety of combustion processes producing these emissions, for instance, coal-or oil-fired furnaces, reciprocating internal combustion engines (including gasoline spark ignition and diesel engines), gas turbine engines, and so on. In each of these combustion processes, control measures to prevent or diminish atmospheric emissions of these emissions are needed.

Industry has devoted considerable effort to reducing regulated emissions from the exhaust streams of combustion processes. In particular, it is now usual in the automotive industry to place a catalytic converter in the exhaust system of gasoline spark ignition engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metals impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be precoated with γ-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a spark ignition engine is operating under stoichiometric conditions or nearly stoichiometric conditions with respect to the fuel : air ratio (just enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system. The stoichiometric conditions or nearly stoichiometric conditions will be referred to as non-oxidizing conditions or as producing a non-oxidizing atmosphere.

However, it is desirable to operate the engine at times under lean burn conditions, with excess air, in order to improve fuel economy. While conventional non-oxidizing engine conditions might have a fuel : air ratio having 0.1-0.3% excess oxygen, with perhaps a slightly greater amount in the exhaust as a result of incomplete combustion, a lean burn engine has a substantially greater excess of oxygen, from about 1% to perhaps up to 10% excess oxygen relative to the amount of fuel. Under lean burn conditions, conventional catalytic devices are not very effective for treating the $NO_x$ in the resulting oxygen-rich exhaust stream. Lean burn conditions will be referred to as oxidizing conditions or as producing an oxidizing atmosphere.

The exhaust stream from a diesel engine also has a substantial oxygen content, from perhaps about 2–18% oxygen, and, in addition, contains a significant amount of particulate emissions. The particulate emissions, or soot, are thought to be primarily carbonaceous particles. It is also believed that other combustion processes result in emissions that are difficult or expensive to control because of, for instance, dilute concentrations of the compounds to be removed from the effluent stream or poor conversion of the compounds using conventional means.

In spite of efforts over the last decade to develop a effective means for reducing $NO_x$ to nitrogen under oxidizing conditions in a spark ignition gasoline engine or in an diesel engine, the need for improved conversion effectiveness has remained unsatisfied. Moreover, there is a continuing need for improved effectiveness in treating emissions from any combustion process, particularly for treating the soot particulate emissions from diesel engines.

An alternative way to treat the hydrocarbon, particulate, or $NO_x$ emissions in an exhaust or effluent stream would be to destroy such emissions using a non-thermal plasma. It is known that non-thermal plasma reactors are useful to treat $NO_x$ and $SO_x$ emissions in power plant flue gases, and even to treat $NO_x$ or particulate emissions in diesel engine exhaust. However, systems now known in the art suffer from serious shortcomings.

First, such systems are run continually, which results in a relatively large power consumption per unit of material destroyed, particularly when used to treat low concentration of emissions in effluent or exhaust streams. A more concentrated emission stream would allow less power consumption per molecule of pollutant destroyed.

Secondly, if the non-thermal plasma reactor is operated under oxidizing conditions, i.e., with an oxidizing atmosphere, nitrous oxide tends to be converted into undesirable nitric oxide and nitric acid. The nitric oxide and nitric acid must then be collected and separately treated or disposed of. In the case of automotive exhaust, the undesirable products cannot be easily collected and disposed of. It would be desirable, therefore, to only operate the non-thermal plasma reactor with a non-oxidizing atmosphere. However, as mentioned, it is desirable for reasons of fuel economy to operate an automotive engine under lean burn conditions for as much of the time of operation as possible.

I have discovered an automotive exhaust system in which hydrocarbon, particulate, or $NO_x$ emissions, or mixtures of these emission, are collected in a storage device, and thus concentrated, prior to treatment in a plasma reactor. The separate collection and destruction functions allow for means to control engine operation to produce an oxidizing atmosphere during collection in the storage device and a non-oxidizing atmosphere during destruction of the collected emissions in a non-thermal plasma. The separate functions also allow the exhaust system to be cycled between storage and destruction to minimize the time during which the plasma reactor is operated. The collected emissions may also be destroyed in the non-thermal plasma while there is an oxidizing atmosphere, so that the engine or combustion process may be controlled in a way that continually produces an oxidizing atmosphere.

BRIEF DESCRIPTION OF THE DRAWINGS

FIGS. 1–3 illustrate preferred configurations for automotive exhaust systems of the invention.

SUMMARY OF THE INVENTION

Figure 3:
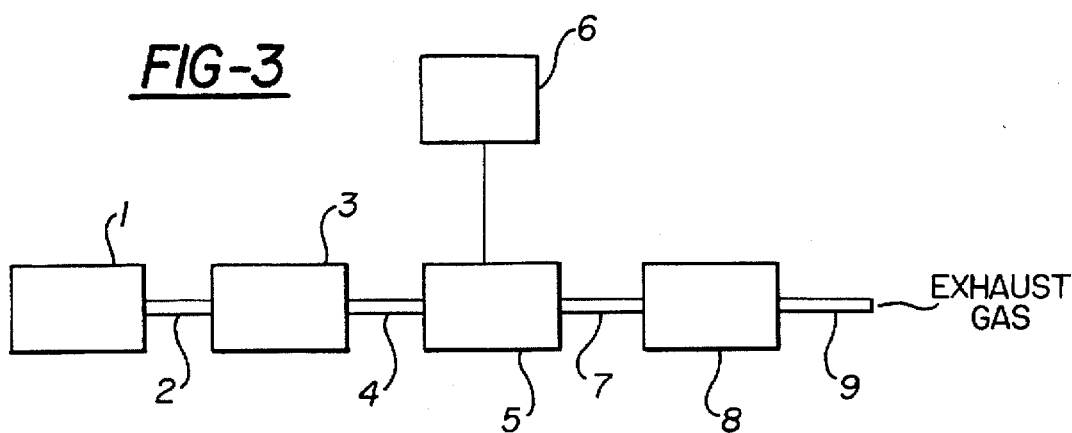

The present invention provides an exhaust system for a combustion process, comprising a storage device with means for collecting $NO_x$, particulate, or hydrocarbon emissions, or any mixtures of these emissions, and a non-thermal plasma reactor. With respect to the direction of flow of the exhaust stream, the storage device is located before the terminus of the plasma reactor, and the storage device may be located before the plasma reactor, overlap with the plasma reactor, or be located within the plasma reactor. Using the emissions storage device and plasma reactor together can improve the efficiency with which the emissions are removed from the exhaust stream and destroyed, particularly in an oxidizing atmosphere, as well as reduce the energy that would be required to operate the plasma reactor.

It is a particular advantage for destruction of hydrocarbon emissions that the plasma reactor can be effectively operated at any temperature, and thus emissions can be destroyed at any temperature.

The present invention also provides a method for collecting at least one of, or a mixture of, hydrocarbon, particulate, and $NO_x$ emissions from an exhaust stream of a combustion process for a period of time, and then destroying the collected emissions in a non-thermal plasma generated in a plasma reactor. The plasma reactor is not operated during the period of time when the emissions are being collected. The collection phase may be for a set interval of time, or may be determined by using a sensor for the emissions being collected. The duration of the collection phase may also be controlled by computer modeling using engine operating parameters. The emissions may be collected by means of adsorption onto a surface, and, unless the adsorbing surface is located within the plasma reactor, the emissions are desorbed after the period of time for collection and carried by the exhaust stream into the plasma reactor.

The invention further provides a method for removing $NO_x$ from an exhaust stream of a combustion process in which the $NO_x$ is adsorbed from the exhaust stream by the packing material of a packed bed plasma reactor. The $NO_x$ can be adsorbed when there is an oxidizing atmosphere and then destroyed by a non-thermal plasma when there is a non-oxidizing atmosphere, but it is preferred to maintain an oxidizing atmosphere even during the destruction phase when the non-thermal plasma is generated. Thus, it is preferred to control the engine or combustion process to produce an oxidizing atmosphere for the exhaust stream both during adsorption and destruction of the $NO_x$.

The present invention may include a conventional catalytic converter downstream of the plasma reactor, with means for chemically treating emissions not destroyed by the plasma reactor.

DETAILED DESCRIPTION OF THE INVENTION

The exhaust system of the present invention, preferably an automotive exhaust system, comprises a storage device and a plasma reactor. With respect to the direction of flow of the exhaust stream, the storage device is located before the terminus of the plasma reactor. Thus, the storage device is located before the plasma reactor, at least partially overlapping the plasma reactor, or within the plasma reactor, with respect to the flow of the exhaust stream. When the storage device is before or partially before the plasma reactor, then the collected emissions are desorbed prior to destruction in the plasma reactor and the exhaust stream carries the desorbed emissions into the plasma reactor for destruction. When the storage device is within the plasma reactor, the adsorbed compounds may, but need not, be desorbed before destruction with the non-thermal plasma.

The storage device comprises means for collecting emissions from an exhaust stream. For example, the storage device may comprise a surface for adsorbing $NO_x$ or hydrocarbons or both, or a particulate trap for collecting soot emissions. Various particulate traps are described in, for example, John H. Johnson, Susan T. Bagley, Linda D. Gratz, and David G. Leddy, "A review of Diesel Particulate Control Technology and Emissions Effects," SAE Paper No. 940233, printed in "Diesel Exhaust After treatment 1994" (1994); and A. Colletta, G. Costa, M. Pinti, and V. Scorsone, "Self-Cleaning Electrostatic Muffler for Diesel Vehicles," SAE Paper No. 952389, printed in "Emissions Processes and Control Technologies in Diesel Engines"(1995), both of which are incorporated herein by reference.

The plasma reactor is capable of generating a non-thermal plasma, which is used to destroy the hydrocarbon and/or $NO_x$ that has been adsorbed.

In the automotive exhaust systems of the invention, the storage device and plasma reactor are placed in the exhaust pipe after the engine and before the end of the tailpipe, so that the exhaust gases must pass through both before being emitted to the atmosphere. When the storage device is located before or partially before the plasma reactor, the compound that has been adsorbed on the surface located outside of the plasma reactor must be desorbed so that it can be carried by the exhaust stream into the plasma reactor for destruction. When the surface for adsorbing the compound is located within the plasma reactor, the compound may optionally be destroyed by the non-thermal plasma without a separate desorption step.

FIG. 1 illustrates a preferred embodiment of the exhaust system of the invention having separate storage device and plasma reactor. During storage mode, an exhaust stream from engine 1 is carried by exhaust pipe 2 to storage surface comprising adsorbing materials such as, for example, a material such as a ceramic, zeolite, or perovskite having copper oxide or barium oxide on the surface, or a particulate trap such as one of the traps described in the above references. The rest of the exhaust stream passes through exhaust pipe 4 and through the plasma reactor 5, and finally to the atmosphere through exhaust pipe 7. No power is supplied to the plasma reactor during the storage mode.

The storage mode is followed by a destruction mode, during which the adsorbed emissions are desorbed from the storage device 3 and carried by the exhaust stream into the plasma reactor 5, where the emissions are destroyed. The desorption may be caused by any means known in the art, for example, by heating the storage device above its desorption temperature. The concentration of emissions in the exhaust stream that enters the plasma reactor during desorption is much greater than in the exhaust first coming off of the engine before the storage device. Power from power supply 6 is supplied to the plasma reactor 5 to generate a non-thermal plasma in which the concentrated emissions in the exhaust stream are destroyed. The treated gases are expelled to the atmosphere with the exhaust stream, again through exhaust pipe 7. Following an effective period of time in the treatment mode, the exhaust system is returned to the storage mode.

The exhaust system should be operated in the treatment mode for a time long enough to destroy most, and preferably all, of the emissions adsorbed in the storage device. The time of operation can be determined by using a sensor downstream of the storage device to detect particulate, $NO_x$ or hydrocarbon, for example the $NO_x$ detector disclosed in U.S. Pat. No. 5,486,336(Dalla Betta, Reed, and Schubert). The exhaust system in this embodiment of the present invention would be operated in storage mode until the sensor detected the breakthrough of the target emission, indicating saturation of the storage device. At that time, the plasma reactor would be turned on and the adsorbed compound would be desorbed and treated in the plasma reactor.

It is also possible to control the cycling between collection and destruction phases by means of computer modeling, using engine operating parameters to predict when the $NO_x$ adsorbing storage device is approaching saturation.

Alternatively, and preferably for cost reasons, the system can be operated in storage and destruction modes for predetermined set intervals. For example, it is envisioned that an exhaust system of the present invention could be operated for from about 75 to about 99.9 % of the time of engine operation in the storage mode, and the balance of the time in the destruction mode. In a particularly preferred embodiment, the exhaust system is operated for from about 45 seconds to about 90 seconds in storage mode and from about 1 second to about 15 seconds in destruction mode. It is preferred to operate a spark ignition internal combustion engine under lean burn conditions at least during storage mode, and it is particularly preferred to also operate a spark ignition internal combustion engine under lean burn conditions during destruction mode.

FIG. 2 illustrates a preferred embodiment of the exhaust system of the invention having the storage device 3 and plasma reactor 5 located at the same point in the exhaust system. In this case, the storage device comprising the adsorbing surface or other means for collecting the desired emission is located within the plasma reactor. The adsorbing surface can be, and preferably is, a dielectric surface of the plasma reactor, for example, the dielectric barrier covering the electrodes in a silent discharge plasma reactor, or the packing material surface in a packed bed plasma reactor. Preferably, the plasma reactor is a packed bed reactor and the storage device comprises the packing material of the plasma reactor. Still more preferably, the packing material comprises means for adsorbing $NO_x$ and particularly means for adsorbing $NO_x$ from an oxidizing atmosphere.

The operation of the exhaust system illustrated by FIG. 2 is essentially identical to the system of FIG. 1, with alternating storage and destruction modes. However, in a configuration of the exhaust system of the present invention as shown in FIG. 2, the desorption step is optional. Particularly when the dielectric surface of the plasma reactor also acts as the adsorbing surface for the emissions or otherwise as means for collecting the emissions, it may be unnecessary to desorb the emissions during the destruction mode when the plasma reactor is operated, and it is believed that destruction may even be more complete if the compound is, in fact, not desorbed.

FIG. 3 illustrates a preferred embodiment of the invention in which the exhaust system further comprises a catalytic converter 8. As before, an exhaust stream from engine 1 is carried by exhaust pipe 2 to storage device 3, where $NO_x$, hydrocarbon, or particulate emissions, or a combination of these emissions, are collected from the exhaust stream. The exhaust stream then passes through exhaust pipe 4 into plasma reactor 5. During destruction mode, the exhaust stream carries the collected emissions from storage device 3 into plasma reactor 5 for destruction. Power supply 6 provides the power to operate the plasma reactor 5. The exhaust stream continues through exhaust pipe 7 into catalytic converter 8, in which any emission not destroyed in the plasma reactor is chemically treated according to methods well-known in the art. The treated exhaust gas finally passes through exhaust pipe 9 and out of the exhaust system.

A particularly preferred method of operation is to combine the storage device and the plasma reactor, so that the adsorbing surface is located within the plasma reactor, and to operate a spark ignition gasoline engine under lean burn conditions during storage mode. It is also particularly preferred to combine the storage device and the plasma reactor for use as an exhaust system for a diesel engine.

The plasma reactor is connected to a power supply and comprises a means of generating a non-thermal plasma. The plasma generated has a mixture of reactive free radicals, ions, and electrons that cause the destruction of the compound, as well as neutral species. In a non-thermal plasma, the electron mean energy is much higher than the ion and gas mean energies. A non-thermal plasma can be generated by a number of methods, including electrical fields, electron beams, and irradiation with electromagnetic energy of appropriate intensity and wavelength. Non-thermal plasmas for treatment of exhaust of internal combustion engines are preferably generated by electrical fields. In this type of generation, the plasma is generated by using a high voltage electrical field that approaches the breakdown voltage for the gas and gap geometry, usually about 20 KV/cm. A local dissociation of electrons results. The electrons accelerate rapidly in the electrical field, striking and ionizing other molecules. The path of ionized molecules and electrons is called the streamer. If the voltage is stopped before or shortly after the streamer crosses the gas gap causing an arc discharge, then a non-thermal plasma of ions and free electrons is formed.

Figure 4:
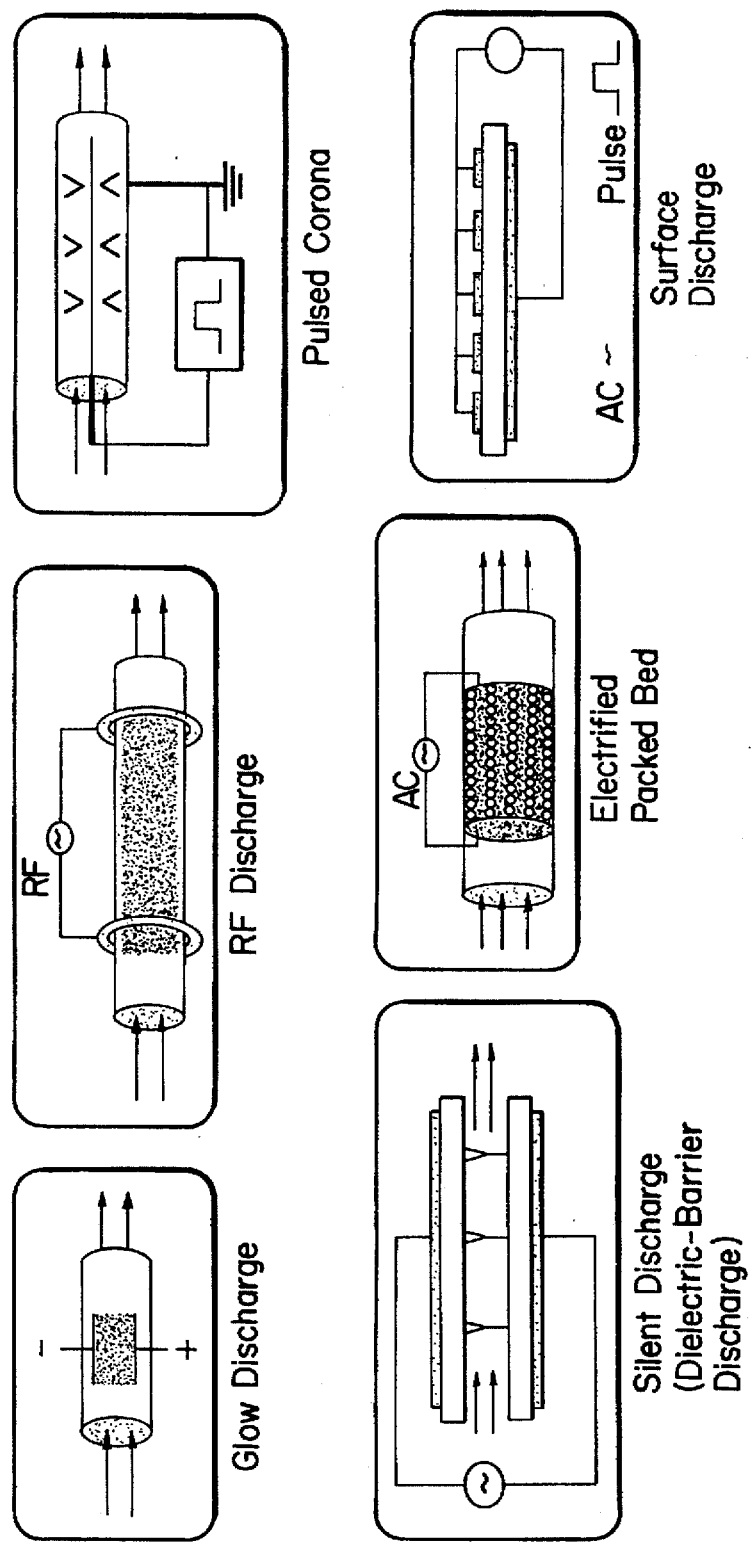
FIG. 4 illustrates suitable types of non-thermal reactors for use in the exhaust systems of the invention.

FIG. 4 illustrates useful configurations for the plasma reactor of the invention. Preferred among these are the dielectric barrier and electrified packed bed reactors. The electrified packed bed reactor is especially preferred. Another preferred configuration is the glow-discharge plasma reactor described in European patent application EP 0 366 876 A1, to Murata et al., entitled, "Exhaust gas treating apparatus," incorporated in its entirety herein by reference. The plasma reactor type and electrode geometry in a non-thermal plasma reactor determines the efficient and thorough treatment of all of the target emissions expected to be in the exhaust stream. The discharges that create the plasma originate at the surface of the electrode at a point where the peak electric field strength is at least about five times that of the average energy field, so the reactor must be chosen to have a sufficient number of such points positioned so as to uniformly treat the target emissions in the exhaust stream.

When the plasma reactor is a corona discharge reactor, the electrical field may be designed to be non-uniform. For example, a small wire can be disposed along the length of the reactor. The electrical field will then be very strong at the wire, but fall off rapidly with increasing distance from the wire and extinguishing before reaching the wall of the reactor, preventing formation of an arc. Alternatively, arc formation can be prevented by supplying a pulsed voltage.

In a dielectric barrier reactor, one or both electrodes are coated with a dielectric barrier. The streamer is extinguished on the surface of the dielectric material.

Packed bed plasma reactors are particularly preferred. In a packed bed reactor, the volume between the electrodes is packed with a dielectric material, for example, with beads. The electrical field is concentrated at the point of contact of the beads because of the difference in dielectric constants of the bead material and the gas.

The dielectric material of the dielectric barrier plasma reactors or the beads or other packing material of the packed bed plasma reactors can be coated with the $NO_x$ or hydrocarbon adsorbent materials described above in connection with the storage device. In this case, the plasma reactor itself becomes the storage device and the surface for adsorbing the compound from the exhaust stream is the surface of the dielectric material of the barrier or the packing material. In a preferred embodiment, the material of the barrier or of the packing material is zirconia, alumina, titanium, or a ceramic, or mixtures that include these materials. For example, one preferred plasma reactor is a reactor packed with zirconia beads or alumina beads. As in the case when the storage device is separate from the plasma reactor, it is preferable to first coat the surface of the dielectric material with gamma-alumina before the material is impregnated with the adsorbing compound or compounds in order to maximize the adsorbent surface to which the exhaust stream exposed.

The surface for adsorbing the $NO_x$ or hydrocarbon compound in the storage device (whether it is before, overlapping, or within the plasma reactor) is coated with any of the materials known in the art to be adsorbents for those emissions. For example, copper, barium, and lanthanum compounds, for example the oxides of those metals, are known to be effective adsorbents. In particular, zeolites such as CuZSM-5 are known in the art to be useful for these purposes. The coated surface is positioned in the storage device to be in contact with the exhaust stream. The coated surface area in contact with the exhaust stream is preferably maximized in order to remove as much of the compound from the exhaust stream as possible, and preferably the surface area is sufficient so that no measurable quantity of the target emissions remains in the exhaust stream.

In one preferred embodiment, the adsorbing material is coated onto the surface of a honeycomb monolith in the storage device. The honeycomb monolith is preferably a ceramic honeycomb monolith of the type widely used for automotive catalytic converters. These monoliths are well-known in the art. Such monoliths are extruded from synthetic cordierite materials (ideally $Mg_2Al_4Si_5O_{18}$) according to well-known ceramic processes. Honeycomb cordierite monoliths are commercially available from Corning, Inc., Corning, N.Y.; and from NGK-Locke, Inc. The resulting cordierite monolith is a macroporous support for the catalysts that has sufficient channels to both permit the exhaust stream to pass at a rate sufficient to avoid an excessive amount of back pressure that would interfere with proper operation of the engine, and also provide an effective surface area to maximize exposure of the exhaust In a particularly preferred embodiment, the surface of the cordierite honeycomb monolith is first coated with a layer of γ-alumina. Monoliths with γ-alumina coatings are manufactured commercially for the automotive industry by various companies, such as Englehard Corp., Jackson, Miss., Johnson Matthey, Wayne, Pa., and Degussa Corp., Dublin, Ohio.

A $NO_x$ or hydrocarbon adsorbing material may be introduced onto the target surface, such as the cordierite monolith or cordierite monolith precoated with gamma-alumina, or the dielectric surface of the plasma reactor, also preferably coated with gamma-alumina, by, for example, the same methods used commercially to apply a coating of the "three-way" catalyst system.

Zeolite material is also a preferred surface. Zeolites such as ZSM-5 are impregnated with the adsorber material, preferably with cupric oxide. Zeolites are known to be active for adsorbing hydrocarbons at low (less than 300° C.) temperatures, and have very high surface areas. However, zeolites degrade at temperatures above about 600° C. and have reduced efficiency in the presence of water vapor. Perovskites, which are thermally stable at temperatures of up to 1200° C., may also be used.

The plasma reactor of the systems of the invention can be operated at any temperature normally encountered in an automotive exhaust system. Thus, the exhaust systems of the invention are advantageously employed to destroy cold start hydrocarbon emissions. It is well-known that a hydrocarbon spike or pulse results when a spark ignition engine is cold-started. Hydrocarbon adsorbers that are now known in the art are effective for adsorbing the hydrocarbon emissions up to about 100° C., By about 300° C., all of the adsorbed hydrocarbon has been desorbed, due to the volatility of those compounds. However, the light-off temperature (the minimum temperature at which effective catalytic conversion begins) of known catalytic converters for hydrocarbon conversion is about 300° C. For this reason, it is known that catalytic converters do not effectively treat cold start hydrocarbon emissions. However, the plasma reactor contained in the exhaust system of the invention can operate and destroy hydrocarbon emissions at room temperatures as well as at elevated temperatures. The plasma reactor is turned on at a temperature at which the hydrocarbon adsorbed in the storage device begins to desorb, and the plasma device is run continuously until all of the hydrocarbon has desorbed. The plasma reactor may be turned on at a preset temperature, determined by known means, for example, with a thermocouple, at which hydrocarbons would be expected to desorb. Alternatively, actual hydrocarbon desorption could be measured by means of an appropriate sensor placed in the exhaust stream downstream of the storage device, or by computer modeling to predict when the storage device approaches saturation.

In a preferred embodiment, the operation of the plasma reactor consumes no more than about 2% of the engine energy consumption. Preferably, the plasma reactor is operated for a period of time that consumes a minimal fraction of the engine energy consumption. For a spark ignition engine run under lean conditions, the energy needed to operate the plasma reactor intermittently according to the methods of the present invention is estimated at from about 0.01% to about 1.0% of the energy engine consumption. The amount of energy consumption for the plasma reactor depends upon the particular type and geometry of reactor as well as the length of time it must be operated during the method of the present invention, which is in turn dependent upon such factors as the size and efficiency of the storage device. These factors can easily be controlled and optimized by person of ordinary skill in the art.

Figure 5:
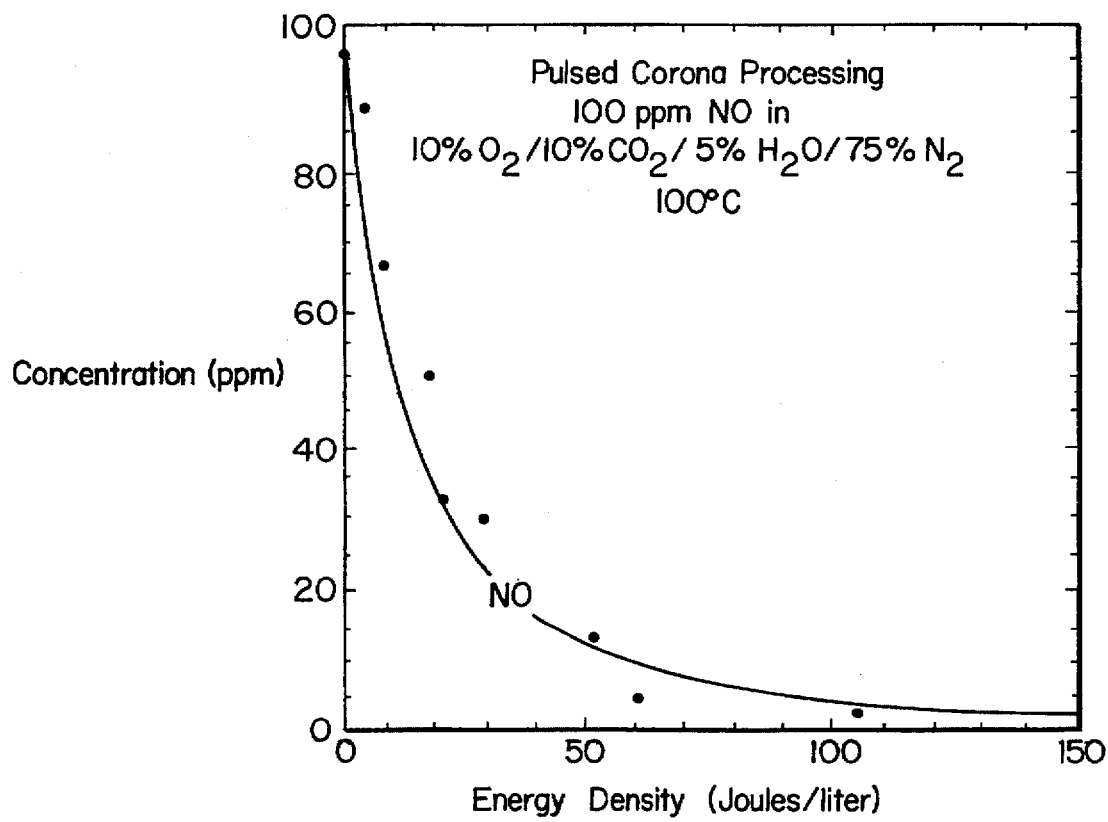
FIG. 5 is a graph of power consumption for a plasma reactor versus concentration of nitrous oxide.

FIG. 5 illustrates a typical graph of power consumption for a plasma reactor versus concentration of nitrous oxide. The curve shows that less energy density is needed when an exhaust stream has a greater concentration of $NO_x$.

The invention has been described in detail with reference to preferred embodiments thereof. It should be understood, however, that variations and modifications can be made within the spirit and scope of the invention.

I claim:

1. An exhaust system for a combustion process, comprising:
    (a) a storage device with means for collecting from an exhaust stream at least one member selected from the group consisting of hydrocarbon, particulate, and $NO_x$ emissions, and mixtures thereof;
    (b) a plasma reactor capable of generating a non-thermal plasma; and
    (c) means for alternating between collection of the emissions in the storage device and destruction of the collected emissions in the plasma reactor, wherein, with respect to the direction of flow of the exhaust stream, the storage device is located before the terminus of the plasma reactor.

2. An exhaust system according to claim 1, wherein the storage device is located before the plasma reactor.

3. An exhaust system according to claim 1, wherein the storage device is located within the plasma reactor.

4. An exhaust system according to claim 1, wherein the plasma reactor is an electrified packed bed plasma reactor.

5. An exhaust system according to claim 4, wherein the storage device comprises the packing material of the plasma reactor.

6. An exhaust system according to claim 5, wherein the packing material comprises means for adsorbing $NO_x$.

7. An exhaust system according to claim 1, wherein the storage device comprises means for collecting $NO_x$ in an oxidizing atmosphere.

8. An exhaust system according to claim 1, further comprising a catalytic converter downstream of the plasma reactor.

9. An exhaust system according to claim 1, further comprising an engine upstream of the storage device.

10. An exhaust system according to claim 9, wherein the engine is selected from the group consisting of gasoline engines and diesel engines.

* * * * *